J. MEYER.
CULTIVATOR PLOW.
No. 36,909.   Patented Nov. 11, 1862.
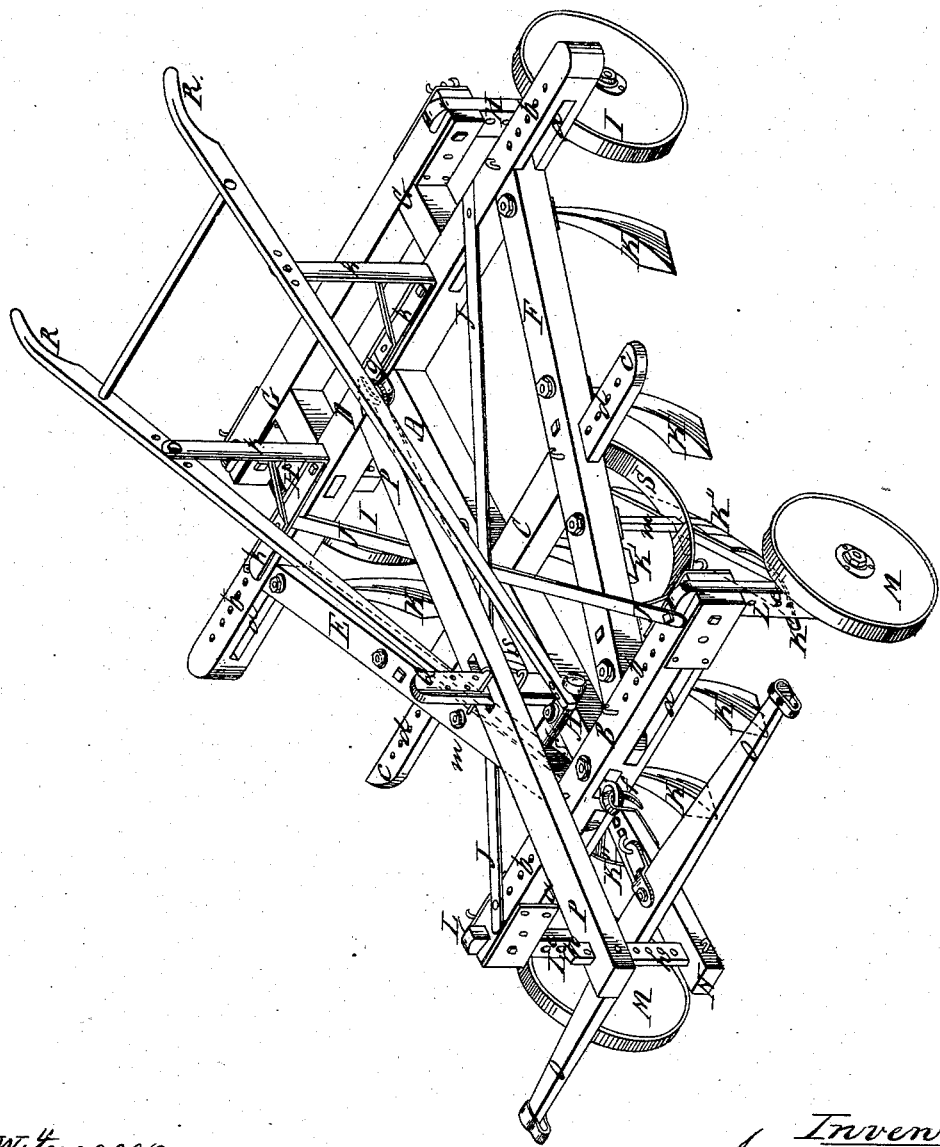
Witnesses
Harry W. Price
John Mathys
Inventor
Joseph Moyer
By atty. A.B. Stoughton

UNITED STATES PATENT OFFICE.

JOSEPH MEYER, OF LINDEN HALL, PENNSYLVANIA.

IMPROVEMENT IN CULTIVATOR-PLOWS.

Specification forming part of Letters Patent No. 36,909, dated November 11, 1862.

*To all whom it may concern:*

Be it known that I, JOSEPH MEYER, of Linden Hall, in the county of Centre and State of Pennsylvania, have invented a new and useful Improvement in Cultivator-Plows; and I do hereby declare the following to be a full, clear, and exact description of the construction and operation of the same, reference being had to the accompanying drawing, making a part of this specification, and which represents in perspective the cultivator-plow complete.

The nature of my invention relates to the particular manner of making the cultivator-plow adaptable to a variety of agricultural purposes by an arrangement of parts that admit of adjustments, both as to height and depth, as well as to width and draft, both the vertical and side draft being adjustable and controllable.

To enable others skilled in the art to make and use my invention, I will proceed to describe the same with reference to the drawing.

The main frame consists of a longitudinal piece, A, three cross-pieces, B C D, and two diagonal pieces, E F. In rear of the cross-piece D and connected to it is a supplemental frame, G, to which, by standards H, the rear supporting-wheels, I I, are attached. Metallic cross-braces J J extend from the front to the rear cross-piece, and where they cross each other are bolted through to the central cross-piece, C. The plows or cultivators K are united to the diagonal pieces E F. The plow or cultivator K', which has a central position with regard to its mates or fellows, is fastened to the longitudinal piece A, and all are set so as to break furrows with each other.

To the front cross-piece, B, at its ends, are down-hangers L, to which the journals that support the front wheels, M, of the cultivator are hung. The cross-pieces B D have long mortises *a a* made in them, into which the tenons on the ends of the diagonal pieces E F enter, and can be made adjustable by a pin or bolt passing through any one of the series of adjusting-holes *b b*, &c., and thus the frame and cultivator may be made wider or narrower throughout, or at either end without the other end, as the character of the work to be done by the implement may require. There are long tenons *c* on the central cross-piece, C, which pass through mortises in the diagonal pieces E F, and by means of the series of holes *d* in the tenons the frame is susceptible of adjustment at this point also.

The standards, or, more properly, downhangers, H H and L L are made adjustable upon their frames by means of the series of holes *e* and a pin passing through for the purpose of regulating the depth at which the plows or cultivators may enter the soil, and this adjustment may be uniform at front and rear, or the plows may be set to run deeper at one end than at the other end, as may be preferred."

The tongue N is hooked at *f* to the front of the main frame, and the double-tree O is fastened to the tongue, as shown in the drawing. P is a draft-regulating bar or lever, hooked to the rear portion of the frame, as at *g*, and adjustable near its center upon an upright, Q, that is mortised into the central piece, A. The tongue N is suspended from the forward end of the bar or lever P by an adjustable stirrup, *h*. This arrangement is for regulating the height of the tongue, and for causing the machine to properly track or follow the team.

The handles R R are fastened at their forward ends to a piece, *i*, that is in turn bolted or otherwise fastened to the central piece, A, and near their rear they are supported by braced angle-irons *k k*, that may be adjusted on the rear cross-piece, D, or to raise or lower the handles to suit the user, by turning them over or rebolting through any suitable one of the adjustable holes therein. Thus the whole machine, as to width, height, draft, or depth of furrow may be varied to suit the circumstances of the case.

S are braces for strengthening the shanks *m* of the cultivators K", of which there are two, one on each side, but one only showing in the drawing. These cultivators K" present more surface to the soil than the others, and consequently there is more strain to resist than with the others, K and K', which are narrower.

The special form of cultivators I have shown are those that I prefer; but others may be used, and I propose to attach them to the frame in such manner as that they may be readily removed and changed for others.

Having thus fully described the nature, object, and purpose of my invention, what I claim therein as new, and desire to secure by Letters Patent, is—

The cultivator-plow constructed, arranged, made capable of adjustment as to height, depth, width, and draft, and operating in the manner and for the purpose herein set forth.

JOSEPH MEYER.

Witnesses:
G. H. WEAVER,
S. T. SHUGUT.